United States Patent
Tiguy et al.

(10) Patent No.: US 10,675,904 B2
(45) Date of Patent: Jun. 9, 2020

(54) IDENTIFICATION DOCUMENT WITH TACTILE FEATURE

(71) Applicant: MorphoTrust USA, LLC, Billerica, MA (US)

(72) Inventors: Ashley S. R. Tiguy, Billerica, MA (US); Daoshen Bi, Boxborough, MA (US); Robert Jones, Andover, MA (US)

(73) Assignee: MorphoTrust USA, LLC, Billerica, MA (US)

( * ) Notice: Subject to any disclaimer, the term of this patent is extended or adjusted under 35 U.S.C. 154(b) by 0 days.

(21) Appl. No.: 16/037,120

(22) Filed: Jul. 17, 2018

(65) Prior Publication Data

US 2018/0339541 A1    Nov. 29, 2018

Related U.S. Application Data

(62) Division of application No. 15/241,647, filed on Aug. 19, 2016, now Pat. No. 10,040,309.
(Continued)

(51) Int. Cl.
*B42D 25/23* (2014.01)
*B42D 25/324* (2014.01)
(Continued)

(52) U.S. Cl.
CPC ............ *B42D 25/23* (2014.10); *B32B 3/28* (2013.01); *B32B 3/30* (2013.01); *B32B 7/12* (2013.01);
(Continued)

(58) Field of Classification Search
CPC ... B42D 25/23; B42D 25/324; B42D 2033/24
See application file for complete search history.

(56) References Cited

U.S. PATENT DOCUMENTS 4,773,677 A * 9/1988 Plasse ................. B42D 25/324
283/70
4,831,244 A 5/1989 Slafer et al.
(Continued)

FOREIGN PATENT DOCUMENTS

| CA | 2841862 A1 * | 1/2013 | ............. B42D 25/29 |
| EP | 2599637 A2 * | 6/2013 | ........... B42D 25/324 |
| WO | WO 2005/024699 | 3/2005 | |

OTHER PUBLICATIONS

International Search Report and Written Opinion, App No. PCT/US16/47751, dated Nov. 7, 2016, 15 pages.
(Continued)

*Primary Examiner* — Kyle R Grabowski
(74) *Attorney, Agent, or Firm* — Fish & Richardson P.C.

(57) ABSTRACT

A method for creating an identification document that includes: defining a debossed region on a surface of a card blank, the debossed region having a pre-determined pattern being indented into the card blank; and applying, as part of a lamination process, an overlay on the surface of the card blank to cover the defined debossed region such that an air gap is formed on the card blank's surface during the lamination process and is sealed and removed after the lamination process, and that a tactile pattern thus created on the surface of the overlay substantially duplicates the pre-determined pattern of the defined debossed region.

18 Claims, 2 Drawing Sheets

Related U.S. Application Data

(60) Provisional application No. 62/207,516, filed on Aug. 20, 2015.

(51) Int. Cl.

| | | |
|---|---|---|
| *B42D 25/455* | (2014.01) | |
| *B42D 25/46* | (2014.01) | |
| *B41M 3/14* | (2006.01) | |
| *B32B 3/30* | (2006.01) | |
| *B32B 3/28* | (2006.01) | |
| *B32B 27/08* | (2006.01) | |
| *B32B 27/30* | (2006.01) | |
| *B32B 27/36* | (2006.01) | |
| *B32B 7/12* | (2006.01) | |
| *B32B 27/10* | (2006.01) | |
| *B32B 27/22* | (2006.01) | |
| *B32B 27/28* | (2006.01) | |
| *B42D 25/309* | (2014.01) | |
| *B42D 25/445* | (2014.01) | |
| *B41M 5/382* | (2006.01) | |

(52) U.S. Cl.
CPC .............. *B32B 27/08* (2013.01); *B32B 27/10* (2013.01); *B32B 27/22* (2013.01); *B32B 27/286* (2013.01); *B32B 27/304* (2013.01); *B32B 27/36* (2013.01); *B32B 27/365* (2013.01); *B41M 3/14* (2013.01); *B42D 25/309* (2014.10); *B42D 25/324* (2014.10); *B42D 25/445* (2014.10); *B42D 25/455* (2014.10); *B42D 25/46* (2014.10); *B32B 2250/02* (2013.01); *B32B 2255/26* (2013.01); *B32B 2307/4023* (2013.01); *B32B 2307/41* (2013.01); *B32B 2307/412* (2013.01); *B32B 2307/518* (2013.01); *B32B 2307/72* (2013.01); *B32B 2425/00* (2013.01); *B41M 5/382* (2013.01); *B41M 2205/02* (2013.01)

(56) References Cited

U.S. PATENT DOCUMENTS

| | | |
|---|---|---|
| 2005/0035590 A1 | 2/2005 | Jones et al. |
| 2008/0272587 A1 | 11/2008 | Bi et al. |
| 2009/0127340 A1 | 5/2009 | Alasia et al. |
| 2010/0258636 A1 | 10/2010 | Theodossiou |
| 2011/0000967 A1 | 1/2011 | Labree et al. |
| 2011/0131737 A1* | 6/2011 | Uyttendaele ............ B41M 3/14 156/182 |
| 2013/0240632 A1 | 9/2013 | Vogt et al. |
| 2015/0174945 A1* | 6/2015 | Garnier ................. B42D 25/29 283/85 |
| 2017/0050459 A1 | 2/2017 | Tiguy et al. |

OTHER PUBLICATIONS

International Search Report in International Application No. PCT/US16/47751, dated Jun. 11, 2018, 8 pages.

EP Office Action in European Appln. No. 16837900.6, dated Mar. 23, 2020, 4 pages.

* cited by examiner

IDENTIFICATION DOCUMENT WITH TACTILE FEATURE

CROSS-REFERENCE TO RELATED APPLICATION

This application is a division of U.S. patent application Ser. No. 15/241,647, filed Aug. 19, 2016, which claims priority under 35 USC § 119(e) to U.S. Provisional Patent Application Ser. No. 62/207,516, filed on Aug. 20, 2015, the entire contents of which is hereby incorporated by reference.

TECHNICAL FIELD

This disclosure generally relates to identification documents, and in particular, relates to identification documents with both visual and tactile variable character.

BACKGROUND

In the "over-the-counter" market, tamper-evident and level one (overt) features may be generated on an identification card. For example, the card may be printed with Dye Diffusion Thermal Transfer (D2T2) technology. D2T2 is the primary means of OTC personalization used in the USA now.

SUMMARY

In one aspect, some implementations include a method for creating an identification document, the method including: defining a debossed region on a surface of a card blank, the debossed region having a pre-determined pattern being indented into the card blank; and applying, as part of a lamination process, an overlay on the surface of the card blank to cover the defined debossed region such that an air gap that is formed on the card blank's surface during the lamination process is sealed and removed after the lamination process, and that a tactile pattern thus created on the surface of the overlay substantially duplicates the pre-determined pattern of the defined debossed region.

Implementations may include one or more of the following features.

The method may include subsequently printing a visible pattern onto the card blank using dye diffusion thermal transfer (D2T2) process in which color formation through the air gap to the debossed region is blocked. The visible pattern may include a portion that matches a least a portion of the tactile pattern in the debossed region. The visible pattern may include a textual pattern attesting to an issuing jurisdiction of the identification document. The visible pattern may be printed to overlap with at least a portion of printed information on the identification document linking the identification document to a subject identified by the identification document. The printed information may include personally identifiable information of the subject, or biometric information of the subject.

The tactile pattern may be created to include a line pattern aligned with a pre-determined pattern in the debossed region such that when the overlay is tampered with, the line pattern becomes misaligned with the pre-determined pattern. The line pattern of the tactile pattern may include at least one line and the pre-determined pattern of the debossed region may comprise at least one line.

In another aspect, some implementations provide an over-the-counter (OTC) card, having a card blank and an overlay, wherein card blank has a debossed region with a pre-determined pattern and the overlay is configured on a surface of a card blank to cover the debossed region such that a tactile pattern is formed in the overlay which substantially duplicates the pre-determined pattern from the debossed region.

Implementations may include one or more of the following features.

The card blank may further include a visible pattern that is printed onto the card using dye diffusion thermal transfer (D2T2) process such that no dye permeates through an air gap formed by the debossed region during the lamination process, wherein the air gap is sealed and removed after the lamination process. The visible pattern may include a portion that matches a least a portion of the pre-determined pattern in the debossed region. The visible pattern may include a textual pattern attesting to an issuing jurisdiction. The visible pattern may be printed to overlap with at least a portion of printed information on the identification document linking the identification document to a subject identified by the identification document. The printed information may include personally identifiable information of the subject, or biometric information of the subject.

The tactile pattern is created to include a line pattern aligned with a pre-determined pattern in the debossed region such that when the overlay is tampered with, the line pattern becomes misaligned with the pre-determined pattern. The line pattern may include at least one line and the pre-determined pattern comprises at least one line.

The details of one or more aspects of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

The disclosure focuses on system and method to achieve tactile features on an over-the-counter (OTC) identity credential with visible prints. In particular, the tactile features can match the visible prints to render the OTC card more resilient to counterfeits. In some implementations, a card blank is created with characteristic that would result in both visual and tactile variable character in the individual's identity credential. The characteristic may include a pattern in the individual's photo that would be very visible and would further result in a tactility duplicating the pattern observed in the photo. The tactile aspect of the feature can be felt in the over-laminated card. Hence, the card results in a pattern that is not only visually apparent but also tactilely duplicating. In these implementations, such features may be on top of the card.

The implementations can generate features that are "tamper-evident" in that the pattern that is resolved in the photo and the over-laminate (by the thermal laminating process in the desktop printer) will be observed as having being tampered with if the visual prints do not match the tactile features. This is because any incursion attempt into the card will result in some stretching or tearing of the over-laminate which will not 'align' with the print pattern seen in the photo or in the card blank. Below, FIGS. 1-2 highlights various features of the OTC card blank features and the process of making a tamper-evident OTC card.

Figure 1A:
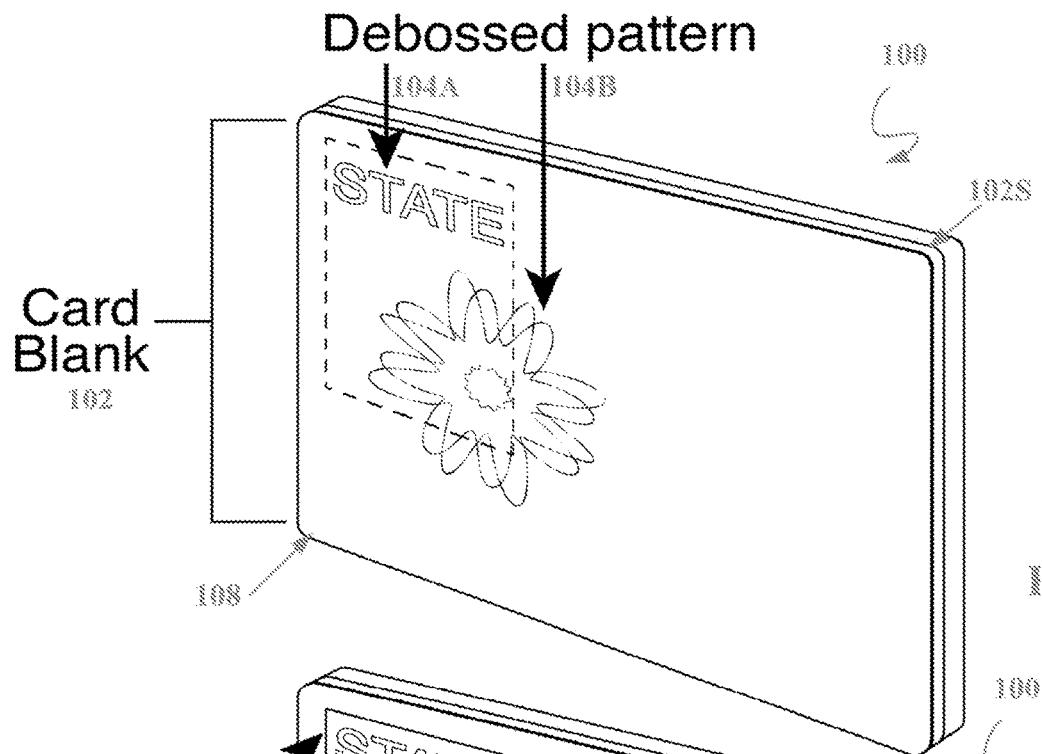
FIG. 1A shows an example of an over-laminate process to embed a debossed pattern in a card blank.
Figure 1B:
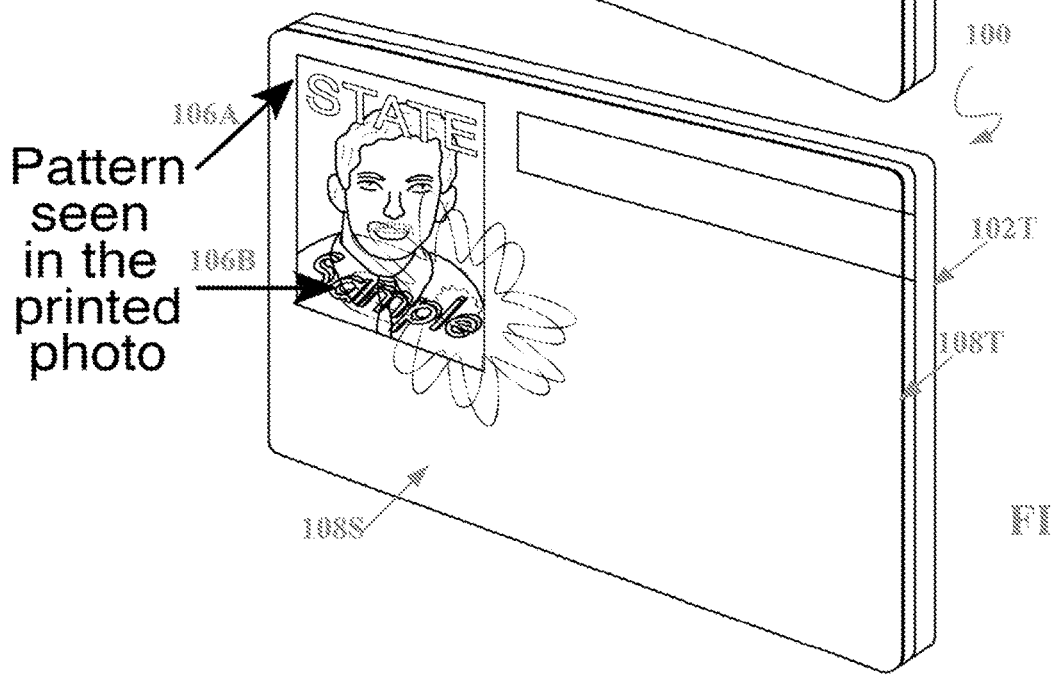
FIG. 1B shows the example to embed the debossed pattern in a card blank when an over-laminate is applied onto the printer card's surface to print visible features.

FIG. 1A-1B show an example of an over-laminate process to embed a debossed pattern in a card blank. Card assembly 100 include card blank 102 and laminate plate 108. In this illustration, the thickness direction of card blank is represented as 102T while the thickness direction of laminate plate represented as 108T. The surfaces facing a user are represented as 102S and 108S, respectively. Here, card blank surface 102S includes debossed patterns representing a textual string "STATE" (104A) as well as a graphical pattern 104B (e.g., the state's emblem).

In this implementation, a laminating plate 108 is etched with a first textual pattern 104A (e.g., name of the state) and a second textual pattern 104B (e.g., other revealing information) in a way that the patterns 106A and 106B ultimately seen in the card assembly 100 are present in the laminate plate 108 as 'proud of the surface' patterns. These two patterns 104A and 104B are then debossed into the card's surface to a depth and width predetermined by the amount of material on proud of the plate's surface. The card lamination process in which all the layers of the credential are fused together may use heat and pressure to emboss (or deboss) the card's surface as well as fuse all the layers of construction. The pattern's design is implemented such that the card will then contain the pattern in the designated area where the photo/demographic information is placed.

In this illustration, a desktop printing process using Dye Diffusion Thermal Transfer (D2T2) technology can be used. Here, dyes are driven over to the card from the ribbon by heat and pressure through diffusion processes and mordanting of the dyes in the polymer matrix of the receiver layer (e.g., laminate plate 108S on card blank surface 102S). In the areas of the card where the 'pattern' is debossed into the card's surface, there are no dyes driven over to the card (through the air gap formed by the debossed area) since the diffusion process cannot proceed across an air gap that is being formed under the print head by an debossed area represented by the debossed pattern. In particular, the air gap is present in the debossed card's surface prior to and during D2T2 printing. The air gap is not present after lamination since the overlay will conform to the contour of the debossed card's surface and therefore no air gap will remain thereafter. In other words, the air gap is sealed and removed after the lamination process.

Figure 2A:
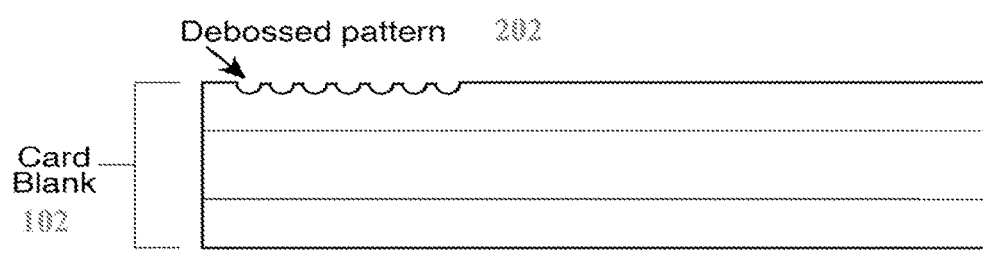
FIG. 2A shows an example of a card blank with a debossed pattern.
Figure 2B:
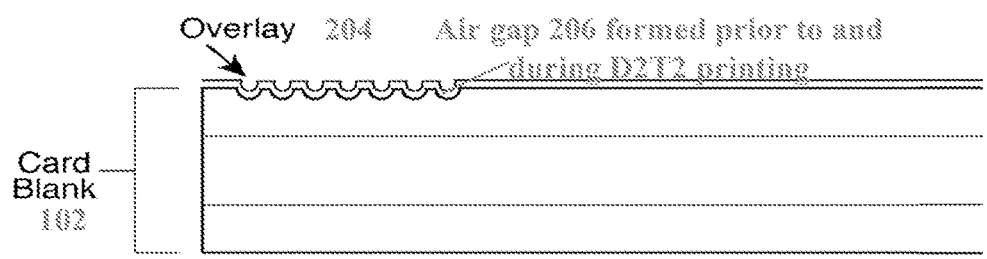
FIG. 2B shows the example of the card blank with an overlay.

Referring to FIGS. 2A-2B showing an example of a card blank with a debossed pattern, the air gap formation is illustrated. Here, the cross sections (e.g., 102T) shows the depth of the debossing into and through the receiver layer (e.g., laminate plate 108S on card blank surface 102S). As illustrated, air gap 206 is created in a space between overlay 204 and debossed pattern 202 prior to and during D2T2 printing. This air gap 206 is a region through which dyes cannot diffuse through during D2T2 printing thus blocking color formation in the patterned areas. Thereafter, the over-laminate layer during the lamination step will conform to the card's surface including the debossed area/pattern and thus the air gap (206) will be eliminated. Generally, the debossed pattern is visible after D2T2 printing and laminating with the overlaminant in the finished card. The portion of a debossed pattern that can be invisible on the overlaminant can be that portion that is either extremely narrow and/or shallow such that the temperature and pressure of the print head results in dye diffusion in those areas.

Generally, the lamination of the overlay over top of the personalized data on the card's surface is the last step following printing in the process. After lamination, there is generally no D2T2 printing on the overlay (or overlaminant). Returning to FIGS. 2A-2B, the preprint on the card's core is available such that the preprint is visible through the areas where the dyes are not present in the photo. Such preprint on the card's core may be known as the offset preprint pattern. This illustration demonstrates that it is possible to see the offset preprint patterns (usually fine lines or microprint visible within the form of patterns 106A and 106B) through the debossed patterns. Such arrangement makes counterfeiting even more difficult to accomplish and presents another characteristic available to those who may authenticate these OTC credentials.

The over-laminate material is heated past its glass transition temperature which allows the material to flow into the depressions in the card surface rendered by the embossing process. This application transmits the pattern into the surface of the over-laminate which then allows one to feel and see the pattern in the surface of the card. The deeper/broader the lines in the pattern, the more tactile and visible the pattern. For context, the offset print pattern may add one more level of authentication. But the debossed pattern is generally unrelated to the preprint pattern which is located inside the card and is offset printed onto one of the card's internal layers.

The over-laminate can be printed by lines of, for example, Tri-Color ink, which—when laminated onto a surface with a predetermined pattern debossed into the card's surface—will show perturbations of the lines coincident to the debossed pattern. Such lines will show tampering if an intrusion attempt has occurred because the nature of the line pattern is affected not only by the debossing but the change after alteration. In other words, such patterns will not line up with that which originated with the debossing pattern and such misalignment would become a tell-tale sign of forgery. In summary, the tactile feature creating an air gap 206 before laminating a printed layer is relatively simple to set up during fabricating, leading to interesting features of a print patterns. However, tampering with such print pattern to forge an OTC document would destroy the underlying alignment, which can be easy to see.

Unlike currencies that are also in wide use by the populace, identification documents are unique to the particular document holder. Therefore, the security features on identification documents can incorporate personalization elements to attest to ownership and further heighten the difficulty for counterfeiting and fakery. Implementations disclosed herein incorporate tactile security features underneath the surface of an identification document. Some implementations may embed authority-specific information in the tactile features.

Identification documents ("ID documents") are broadly defined to include, for example, credit cards, bank cards, phone cards, passports, driver's licenses, network access cards, employee badges, debit cards, security cards, visas, immigration documentation, national ID cards, citizenship cards, permanent resident cards (e.g., green cards), Medicare cards, Medicaid cards, social security cards, security badges, certificates, identification cards or documents, voter registration cards, police ID cards, border crossing cards, legal instruments, security clearance badges and cards, gun permits, gift certificates or cards, membership cards or badges, etc., etc. Also, the terms "document," "card," "badge" and "documentation" are used interchangeably throughout this patent application.

Many types of identification cards and documents, such as driving licenses, national or government identification cards, bank cards, credit cards, controlled access cards and smart cards, carry thereon certain items of information which relate to the identity of the bearer. Examples of such information include name, address, birth date, signature and photographic image. The cards or documents may in addition carry other variant data (i.e., data specific to a particular card or document, for example an employee number) and invariant data (i.e., data common to a large number of cards, for example the name of an employer). All of the cards described above will hereinafter be generically referred to as "ID documents."

An example ID document can include a core layer (which can be pre-printed), such as a light-colored, opaque material (e.g., TESLIN (available from PPG Industries) or polyvinyl chloride (PVC) material) or Polycarbonate (PC). The core is laminated with a transparent material, such as clear PVC or PC to form a so-called "card blank". Information, such as variable personal information (e.g., photographic information), is printed on the card blank using a method such as Dye Diffusion Thermal Transfer ("D2T2") printing (described further below and also described in commonly assigned U.S. Pat. No. 6,066,594, which is incorporated herein by reference in its entirety.) The information can, for example, include an indicium or indicia, such as the invariant or nonvarying information common to a large number of identification documents, for example the name and logo of the organization issuing the documents. The information may be formed by any known process capable of forming the indicium on the specific core material used.

Systems for issuing ID documents may include two main types, namely so-called "central" issue (CI), and so-called "on-the-spot" or "over-the-counter" (OTC) issue. The disclosed technologies may operate for both ID documents, and can operate more advantageously for the OTC cards.

CI type ID documents are not immediately provided to the bearer, but are later issued to the bearer from a central location. For example, in one type of CI environment, a bearer reports to a document station where data is collected, the data are forwarded to a central location where the card is produced, and the card is forwarded to the bearer, often by mail.

Another illustrative example of a CI assembling process occurs in a setting where a driver passes a driving test, but then receives her license in the mail from a CI facility a short time later. Still another illustrative example of a CI assembling process occurs in a setting where a driver renews her license by mail or over the Internet, then receives a driver's license card through the mail.

In contrast, a CI assembling process is more of a bulk process facility, where many cards are produced in a centralized facility, one after another. (For example, picture a setting where a driver passes a driving test, but then receives her license in the mail from a CI facility a short time later. The CI facility may process thousands of cards in a continuous manner).

Centrally issued identification documents can be produced from digitally stored information and generally include an opaque core material (also referred to as "substrate"), such as paper or plastic, sandwiched between two layers of clear plastic laminate, such as polyester, to protect the aforementioned items of information from wear, exposure to the elements and tampering. The materials used in such CI identification documents can offer the ultimate in durability.

In addition, a CI assembling process can be more of a bulk process facility, in which many cards are produced in a centralized facility, one after another. The CI facility may, for example, process thousands of cards in a continuous manner. Because the processing occurs in bulk, CI can have an increase in efficiency as compared to some OTC processes, especially those OTC processes that run intermittently. Thus, CI processes can sometimes have a lower cost per ID document, if a large volume of ID documents are manufactured.

In contrast to CI identification documents, OTC identification documents are issued immediately to a bearer who is present at a document-issuing station. An OTC assembling process provides an ID document "on-the-spot". (An illustrative example of an OTC assembling process is a Department of Motor Vehicles ("DMV") setting where a driver's license is issued to person, on the spot, after a successful exam). In some instances, the very nature of the OTC assembling process results in small, sometimes compact, printing and card assemblers for printing the ID document. This, an OTC card issuing process can be by its nature an intermittent-in comparison to a continuous-process. The disclosed technologies can be more applicable to OTC cards. Some technologies can generate variable tactile characteristics via YAG laser or via Datacard's embossing techniques (credit card style). The disclosed technologies, however, can generate tactile features via a specific card characteristic (e.g., matching visual features) as described herein.

OTC identification documents of the types mentioned above can take a number of forms, depending on cost and desired features. Some OTC ID documents include highly plasticized poly(vinyl chloride) or have a composite structure with polyester laminated to 0.5-2.0 mil (13-51 µm) poly(vinyl chloride) film, which provides a suitable receiving layer for heat transferable dyes which form a photographic image, together with any variant or invariant data required for the identification of the bearer. Other dye receivers are designed as coatings that are applied to the surface of the card by a number of processes and serve the same ultimate purpose. These data are subsequently protected to varying degrees by clear, thin (0.5 to 1.0 mil, 12 to 25.4 µm) overlay patches applied at the printhead, holographic hot stamp foils (0.125-0.250 mil 3-6 µm), or a clear polyester laminate (0.5-10 mil, 13-25.4 µm) supporting common security features. These last two types of protective foil or laminate sometimes are applied at a laminating station separate from the printhead. The choice of laminate dictates the degree of durability and security imparted to the system in protecting the image and other data.

The terms "indicium" and indicia as used herein cover not only markings suitable for human reading, but also markings intended for machine reading, and include (but are not limited to) characters, symbols, codes, graphics, images, etc. Especially when intended for machine reading, such an indicium need not be visible to the human eye, but may be in the form of a marking visible only under infra-red, ultraviolet or other non-visible radiation. Thus, in at least some embodiments of the invention, an indicium formed on any layer in an identification document (e.g., the core layer) may be partially or wholly in the form of a marking visible only under non-visible radiation. Markings comprising, for example, a visible "dummy" image superposed over a nonvisible "real" image intended to be machine read may also be used.

"Laminate" and "overlaminate" include (but are not limited to) film and sheet products. Laminates usable with at least some embodiments of the invention include those which contain substantially transparent polymers and/or substantially transparent adhesives, or which have substantially transparent polymers and/or substantially transparent adhesives as a part of their structure, e.g., as an extruded feature. Examples of usable laminates include at least polyester, polycarbonate, polystyrene, cellulose ester, polyolefin, polysulfone, or polyamide. Laminates can be made using either an amorphous or biaxially oriented polymer as well. The laminate can include a plurality of separate laminate layers, for example a boundary layer and/or a film layer.

The degree of transparency of the laminate can, for example, be dictated by the information contained within the identification document, the particular colors and/or security features used, etc. The thickness of the laminate layers may vary, for example, in some implementations, the thickness of a laminate layer can be about 1-20 mils. Lamination of laminate layer(s) to other layers of material (e.g., a core layer) can be accomplished using any conventional lamination process, and such processes are known to those skilled in the production of articles such as identification documents.

For example, in ID documents, a laminate can provide a protective covering for the printed substrates and provides a level of protection against unauthorized tampering (e.g., a laminate would have to be removed to alter the printed information and then subsequently replaced after the alteration). Various lamination processes are disclosed in assignee's U.S. Pat. Nos. 5,783,024, 6,007,660, 6,066,594, and 6,159,327. Other lamination processes are disclosed, e.g., in U.S. Pat. Nos. 6,283,188 and 6,003,581. Each of these U.S. patents is herein incorporated by reference.

The material(s) from which a laminate is made may be transparent, but need not be. Laminates can include synthetic resin-impregnated or coated base materials composed of successive layers of material, bonded together via heat, pressure, and/or adhesive. Laminates also includes security laminates, such as a transparent laminate material with proprietary security technology features and processes, which protects documents of value from counterfeiting, data alteration, photo substitution, duplication (including color photocopying), and simulation by use of materials and technologies that are commonly available. Laminates also can include thermosetting materials, such as epoxy.

For purposes of illustration, the description explains ID document structures (e.g., TESLIN-core, multi-layered ID documents) and fused polycarbonate structures as example structures. The discussions herein are generally relevant to articles to which a laminate and/or coating is applied, including articles formed from paper, wood, cardboard, paperboard, glass, metal, plastic, fabric, ceramic, rubber, along with many man-made materials, such as microporous materials, single phase materials, two phase materials, coated paper, synthetic paper (e.g., TYVEC, manufactured by Dupont Corp of Wilmington, Del.), foamed polypropylene film (including calcium carbonate foamed polypropylene film), plastic, polyolefin, polyester, polyethyleneterephthalate (PET), PET-G, PET-F, and polyvinyl chloride (PVC), Polycarbonate and combinations thereof.

A number of implementations have been described. Nevertheless, it will be understood that various modifications may be made without departing from the spirit and scope of the subject innovation. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. An identification document comprising:
    a card blank comprising a polymeric receiving layer having a debossed region formed on a surface of the receiving layer, the debossed region comprising a pattern of indentations extending below the surface of the receiving layer;
    an over-laminate layer over the receiving layer of the card blank, the over-laminate layer comprising a tactile pattern overlapping and substantially duplicating the pattern of the debossed region, the tactile pattern being formed in a planar surface of the over-laminate layer and comprising recesses in the planar surface that correspond with the indentations of the debossed region and surface segments; and
    a printed image overlapping the debossed region, wherein dye that forms the printed image is present on surface segments adjacent to at least one indentation and the dye is not present inside the indentation.

2. The identification document of claim 1, wherein the tactile pattern comprises a textual pattern attesting to an issuing jurisdiction of the identification document.

3. The identification document of claim 1, wherein the printed image comprises personally identifiable information of a subject identified by the identification document or biometric information of the subject identified by the identification document.

4. The identification document of claim 1, wherein the dye is Dye Diffusion Thermal Transfer (D2T2) dye from a D2T2 printing process.

5. The identification document of claim 1, wherein the card blank comprises microprint that is visible through the layer and in the at least one recess.

6. The identification document of claim 1, wherein the over-laminate comprises a line print image that is printed as lines of Tri-Color ink, the line print image overlapping the tactile pattern.

7. An over-the-counter (OTC) card comprising:
    a card blank comprising a polymeric receiving layer having a debossed region formed on a surface of the receiving layer, the debossed region comprising a pattern of indentations extending below the surface of the receiving layer;
    an over-laminate layer over the receiving layer of the card blank, the over-laminate layer comprising a tactile pattern overlapping and substantially duplicating the pattern of the debossed region, the tactile pattern being formed in a planar surface of the over-laminate layer and comprising recesses in the planar surface that correspond with the indentations of the debossed region and surface segments; and
    a printed image overlapping the debossed region, wherein dye that forms the printed image is present on surface segments adjacent to at least one indentation and the dye is not present inside the indentation.

8. The OTC card of claim 7, wherein the tactile pattern comprises a textual pattern attesting to an issuing jurisdiction of the OTC card.

9. The OTC card of claim 7, wherein the printed image comprises personally identifiable information of a subject identified by the OTC card or biometric information of the subject identified by the OTC card.

10. The OTC card of claim 7, wherein the dye is Dye Diffusion Thermal Transfer (D2T2) dye from a D2T2 printing process.

11. The OTC card of claim 7, wherein the card blank comprises microprint that is visible through the layer and in the at least one recess.

12. The OTC card of claim 7, wherein the over-laminate comprises a line print image that is printed as lines of Tri-Color ink, the line print image overlapping the tactile pattern.

13. A document comprising:
- a base layer comprising a polymeric receiving layer having a debossed region formed on a surface of the receiving layer, the debossed region comprising a pattern of indentations extending below the surface of the receiving layer;
- a layer over the base layer comprising a tactile pattern overlapping and substantially duplicating the pattern of the debossed region, the tactile pattern being formed in a planar surface of the layer and comprising recesses in the planar surface that correspond with the indentations of the debossed region and surface segments; and
- a printed image overlapping the debossed region, wherein dye that forms the printed image is present on surface segments adjacent to at least one recess and the dye is not present inside the recess.

14. The document of claim 13, wherein the tactile pattern comprises a textual pattern attesting to an issuing jurisdiction of the document.

15. The document of claim 13, wherein the printed image comprises personally identifiable information of a subject identified by the document or biometric information of the subject identified by the document.

16. The document of claim 13, wherein the dye is Dye Diffusion Thermal Transfer (D2T2) dye from a D2T2 printing process.

17. The document of claim 13, wherein the base layer comprises microprint that is visible through the layer and in the at least one recess.

18. The document of claim 13, wherein the over-laminate comprises a line print image that is printed as lines of Tri-Color ink, the line print image overlapping the tactile pattern.

* * * * *